(12) United States Patent
Kim et al.

(10) Patent No.: US 7,428,741 B2
(45) Date of Patent: Sep. 23, 2008

(54) OPTICAL STORAGE CAPABLE OF REDUCING POWER CONSUMPTION

(75) Inventors: Joong El Kim, Kyungki-do (KR); Jun Kun Choi, Kyungki-do (KR)

(73) Assignee: Samsung Electro-Mechanics Co., Ltd., Kyungki-Do (KR)

(*) Notice: Subject to any disclaimer, the term of this patent is extended or adjusted under 35 U.S.C. 154(b) by 641 days.

(21) Appl. No.: 10/967,162

(22) Filed: Oct. 19, 2004

(65) Prior Publication Data

US 2006/0005214 A1 Jan. 5, 2006

(30) Foreign Application Priority Data

Jun. 30, 2004 (KR) .................. 10-2004-0050724

(51) Int. Cl.
*G11B 33/14* (2006.01)
*G11B 17/03* (2006.01)
*G11B 17/04* (2006.01)

(52) U.S. Cl. .............. 720/648; 720/655; 360/132; 360/97.01; 360/97.02

(58) Field of Classification Search ............... None
See application file for complete search history.

(56) References Cited

U.S. PATENT DOCUMENTS 6,493,310 B1* 12/2002 Kim et al. ............ 720/611
7,086,069 B2* 8/2006 Choi ...................... 720/603

FOREIGN PATENT DOCUMENTS

| JP | 07-21761 | 1/1995 |
|----|----------|--------|
| JP | 11-317065 A | 11/1999 |
| JP | 2000-132957 A | 5/2000 |
| JP | 2001-110175 A | 4/2001 |
| JP | 2001-155479 A | 6/2001 |
| JP | 2001-160283 A | 6/2001 |
| JP | 2001-176260 A | 6/2001 |
| JP | 2002-230962 A | 8/2002 |
| JP | 2003-263879 A | 9/2003 |
| KR | 1998-13873 | 4/1998 |
| KR | 350974 | 11/1999 |
| KR | 334094 | 7/2000 |

OTHER PUBLICATIONS

Japanese Patent Office, Office Action mailed Sep. 25, 2007 and English Translation.

* cited by examiner

*Primary Examiner*—Angel Castro
*Assistant Examiner*—Christopher R. Magee
(74) *Attorney, Agent, or Firm*—Lowe Hauptman Ham & Berner

(57) ABSTRACT

In an optical storage, a base is defined in a bottom of a space which receives a disk. A drive unit is mounted on the base for turning the disk around a drive axis. A shroud is defined in a side of the space, and a cover is defined in a top of the space. The cover has a slanted line extended from a central portion of the cover toward the shroud at an upward inclination with respect to a disk plane when seen in a cross-section taken along a line perpendicular to the disk plane.

8 Claims, 6 Drawing Sheets

OPTICAL STORAGE CAPABLE OF REDUCING POWER CONSUMPTION

CLAIM OF PRIORITY

This application claims the benefit of Korean Patent Application No. 2004-50724 filed on Jun. 30, 2004, in the Korean Intellectual Property Office, the disclosure of which is incorporated herein by reference.

BACKGROUND OF THE INVENTION

1. Field of the Invention

The present invention relates to an optical storage capable of reducing power consumption. More particularly, the present invention designs a disk-receiving space into a structure capable of reducing skin friction, flow resistance and torque, which are generated on the surface of a disk and within a housing owing to the flow of fluid in vicinity of the disk in the high speed rotation of the disk, thereby to reduce power consumption, noise and vibration of an optical storage or a hard disk drive.

2. Description of the Related Art

Optical storages are an apparatus for storing (recording) or regenerating (retrieving) voice, image and text data based upon optical laser technology. The optical storages include CD-ROM, CD-R, CD-RW, DVD-ROM, DVD-RAM, DVD+RW, DVD-RW, MMVF, HD DVD drives. Disks used by the optical storages may have various diameters such as 2.5, 3.5, 4.72, 5.25 and 12 inches.

An optical storage of this type generally turns a disk at a high speed in order to rapidly and stably record, read and retrieve massive data.

The high-speed rotation of the disk causes various problems such as strong turbulence, flow resistance, friction and fluttering induced from the flow of fluid in a space around the disk. These problems may also create vibration and noise thereby increasing power consumption.

This is particularly disadvantageous in case of a notebook computer since a battery of the notebook computer will be more rapidly exhausted thereby to reduce run time.

FIG. 1 is a cross-sectional view illustrating a housing loaded with a disk in a conventional OMS, and FIG. 2 is a graph illustrating a skin friction coefficient curve with respect to the distance from the disk center in the OMS shown in FIG. 1.

As shown in FIG. 1, the conventional OMS housing is spaced at predetermined distances from the top and underside of the disk, but does not provide any structure or configuration for improving the flow of fluid in the rotation of the disk.

In the OMS housing, an upper height H1 from the top of the disk 10 to the ceiling of the housing 1 is generally different from a lower height H2 from the bottom of the housing 1 to the underside of the disk 10. This causes pressure difference between above and under the disk 10 in the high-speed rotation thereof, and the pressure difference also functions as a factor of fluttering during the rotation of the disk 10.

In the high-speed rotation of a disk, the pressure around the disk decreases in proportion to the square of the circumferential velocity from the center of the disk to the outer circumference so as to produce high pressure in a central portion of the disk and low pressure in an outer circumferential portion of the disk. This as a result generates vibration and noise to the disk as well as increases power consumption because of increase in flow resistance. This phenomenon becomes more significant according to the increase of the difference between the upper and lower heights.

High-speed rotation of the disk inside the optical storage creates strong turbulent motion or turbulence, which in turn collides against the side wall of the housing 1 generating vibration and noise. The flow of fluid around the disk sharply increases skin friction and torque at the circumference of the disk thereby elevating power consumption.

As shown in FIG. 2, the skin friction coefficient curve rises sharply around the circumference of the disk. The sharp rise of the skin friction coefficient curve will have a large value when integrated, and therefore can increase power consumption since power consumption is proportional to the integrated value of a skin friction coefficient curve as will be described later.

As a drawback, the conventional optical storage consumes more power because of the above-described fluttering, turbulent fluctuation and increase in skin friction and torque around the circumference of the disk A solution to this problem was disclosed in Korean Patent Application No. 1998-13873, entitled "Apparatus for Reducing Noise in an Optical Disk Drive." This document proposes grooves formed in the top of a tray, by which radial flow generated in the rotation of a disk is converted perpendicularly or toward the center of rotation of the disk.

By modifying the configuration of the tray, this solution aims to remove the velocity gradient in a boundary layer occurring on the surface of a disk as well as to prevent the collision of high speed air flow occurring on the leading end of the disk thereby reducing noise and vibration.

FIG. 3A is a plan view of a conventional tray having a helical groove formed on the top thereof (as disclosed in Korean Patent Application No. 1998-13873), and FIG. 3B is a cross sectional view of the tray shown in FIG. 3A with a disk loaded thereon.

As shown in FIGS. 3A and 3B, a groove 3 is formed in the top of a tray 2 under a disk 10 so that any velocity gradient induced from radial flow under the disk 10 can be removed. However, this structure has only a limited capability for decreasing skin friction or torque induced from fluid flowing in a radial direction of the disk, and therefore can reduce power consumption by an insignificant quantity.

That is, similar to the graph shown in FIG. 2, a skin friction coefficient curve sharply rises in vicinity of the outer circumference of the disk and therefore increases the integrated value thereof so that power consumption is also increased from the relation between power consumption and skin friction coefficient as will be described later.

Furthermore, since this apparatus modifies only the tray 2 under the disk 10, but does not provide any means for preventing flow resistance occurring on the top or side of the disk 10 owing to fluid fluctuation. Accordingly, this apparatus still has a problem in that it cannot obtain an effect of reducing skin friction, noise or vibration.

This apparatus also cannot fundamentally prevent fluttering induced from the pressure difference between above and under the disk in the high speed rotation of the disk and therefore the increase of flow resistance and skin friction.

This problem is equally observed not only the optical storage but also a Hard Disk Drive (HDD) which turns a disk at a high speed. Therefore, the following description of the specification and the claims can be applied not only to general optical storages but also to HDDs for reading data from a disk, which rotates at a high speed, or storing data into the disk.

SUMMARY OF THE INVENTION

The present invention has been made to solve the foregoing problems of the prior art and therefore one object of the present invention is to modify a disk-receiving space into a structure capable of decreasing flow resistance induced from turbulent motion in the high speed rotation of a disk in order to reduce the integrated value of skin friction coefficient on the surface of the disk, thereby reducing power consumption.

Another object of the present invention is to decrease flow resistance on the surface of a disk and within a housing as well as the pressure difference between central and circumferential portions of the disk in order to reduce flow resistance and power consumption induced from the noise, vibration and fluttering of the disk.

According to an aspect of the invention for realizing the object, there is provided an optical storage comprising: a base defined in a bottom of a space which receives a disk; a drive unit mounted on the base for turning the disk around a drive axis; a shroud defined in a side of the space; and a cover defined in a top of the space, wherein the cover has a slanted line extended from a central portion of the cover toward the shroud at an upward inclination with respect to a disk plane when seen in a cross-section taken along a line perpendicular to the disk plane, so that a central height from the disk plane to the central portion of the cover on the drive axis is smaller than a circumferential height from the disk plane to the cover at the shroud, whereby flow resistance in high speed rotation of the disk is reduced to reduce power consumption.

Preferably, the slanted line is straight or curved, and wherein an angle defined between the disk plane and the straight line is in the range from about 0.9 to 1.5 degrees.

According to another aspect of the invention for realizing the object, there is provided an optical storage comprising: an optical storage comprising: a base defined in a bottom of a space which receives a disk; a drive unit mounted on the base for turning the disk around a drive axis; a shroud defined in a side of the space; and a cover defined in a top of the space, wherein the shroud has a curved portion, the curved portion being outwardly expanded away from the disk in order to reduce the resistance of flow that is redirected between the outer circumference of the disk and the shroud, whereby power consumption is reduced.

Preferably, the curved portion has lower and upper curved sections on the basis of the top and underside of the disk, wherein the upper and lower curved sections divide flow directed toward the shroud into two partial flows directed toward under and above the disk, respectively, at the outer circumference of the disk.

According to still another aspect of the invention for realizing the object, there is provided an optical storage comprising: n optical storage comprising: a base defined in a bottom of a space which receives a disk; a drive unit mounted on the base for turning the disk around a drive axis; a shroud defined in a side of the space; a cover defined in a top of the space; and a bump projected from the base toward the disk along a concentric circle with respect to the rotation center of the disk in order to reduce shear stress that is mainly generated at the circumference of the disk owing to the rotation of the disk, whereby power consumption is reduced.

Preferably, the bump has an inner side facing the disk center, wherein the inner side meets the base at a point distanced from the disk center for about 0.7 to 0.9 times of the radius of the disk and is slanted upward with respect to the base toward the circumference of the disk at the meeting point at an angle of about 30 to 90 degree.

In general, drive current I necessary for turning a disk can be expressed as Equation 1 below:

$$I = \frac{T}{K_T},\qquad\text{Equation 1}$$

wherein KT indicates torque constant, and T indicates a torque created on the disk surface. KT will be expressed as Equation 2 below:

$$T = -\int_0^R \tau_\varpi 2\pi r \cdot r dr,\qquad\text{Equation 2}$$

wherein $\tau_\omega$ indicates shear stress, and R indicates disk radius.

In the meantime, the skin friction coefficient CF on the disk surface in the rotation of the disk will be expressed as Equation 3 below:

$$C_F = \frac{\tau_\varpi}{\frac{1}{2}\rho v^2}.\qquad\text{Equation 3}$$

From Equations 1 to 3 above about shear stress $\tau_\omega$, torque T and skin friction coefficient CF, it will be understood that the drive current I necessary for turning the disk is proportional to a value obtained by integrating the skin friction coefficient CF from 0 to R of radius (hereinafter will be referred to as "integrated value of skin friction coefficient").

As a result, it is required to reduce the integrated value of skin friction coefficient in order to reduce power consumed in the rotation of the disk.

The present invention have features of modifying the structure of a cover as the top of a housing, a shroud as the side of the housing and a base as the bottom of the housing in order to decrease skin friction and torque induced from flow resistance on the surface of a disk created from fluid flow around the disk in the high speed rotation of the disk and to decrease flow resistance created when partial flow separated from main flow around the outer circumference of the disk collides into the housing, thereby reducing power consumption necessary for the actuation of the disk.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Preferred embodiments of the present invention will now be described in detail with reference to the accompanying drawings.

Figure 4A:
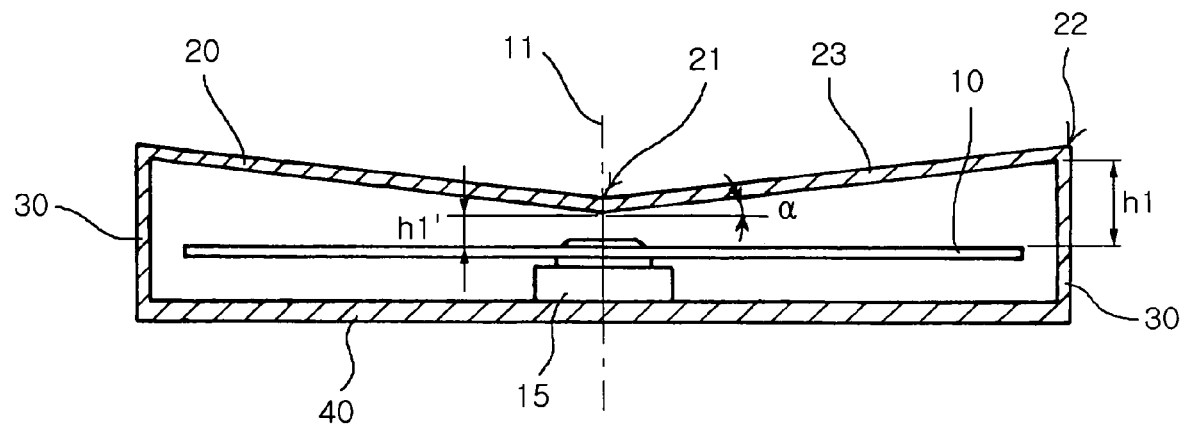
FIG. 4A is a cross-sectional view illustrating a cover of a housing according to the present invention.
Figure 4B:
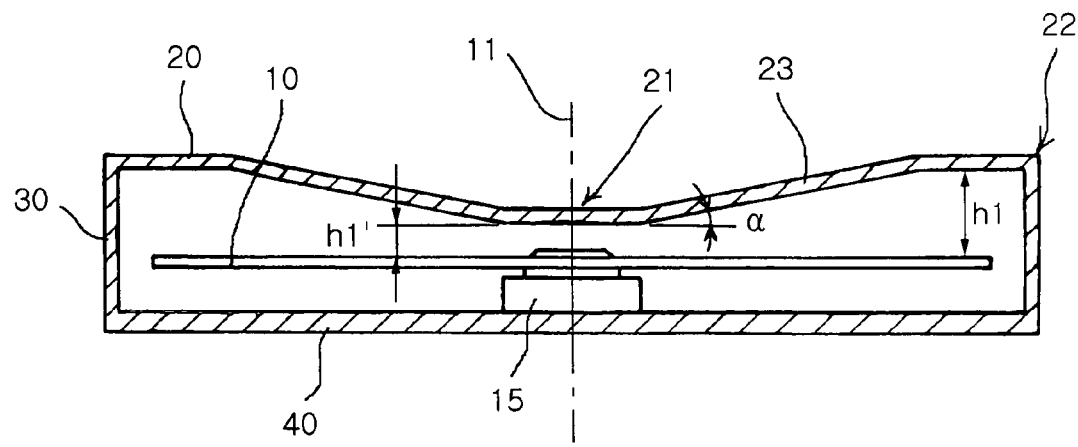
FIG. 4B illustrates a modification to the housing shown in FIG. 4A.
Figure 5A:
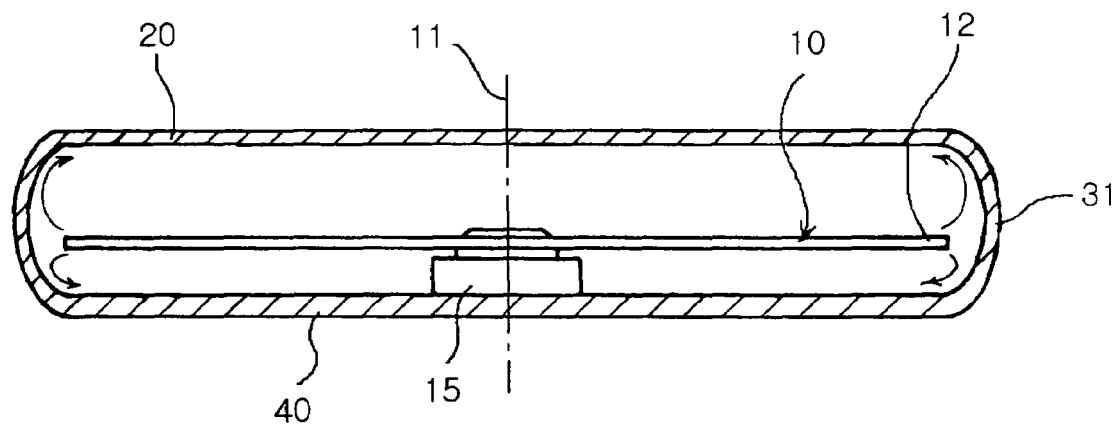
FIG. 5A is a cross-sectional view illustrating a shroud of a housing according to the present invention.
Figure 5B:
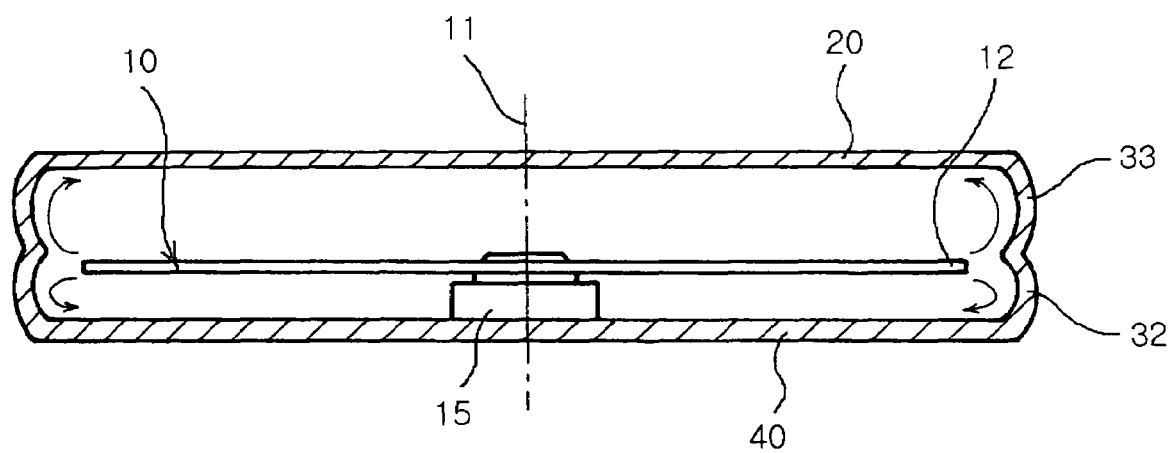
FIG. 5B illustrates a modification to the housing shown in FIG. 5A.
Figure 6:
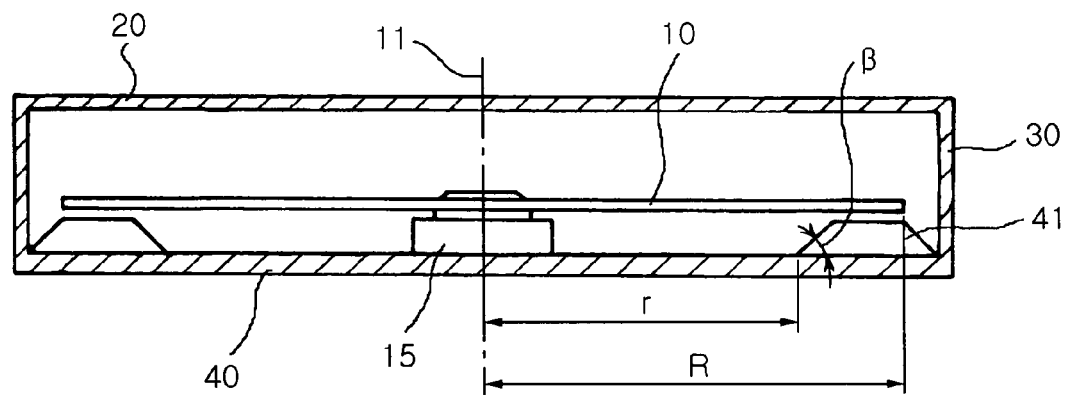
FIG. 6 is a cross-sectional view illustrating bumps mounted on a base of a housing according to the present invention.

FIG. 4A is a cross-sectional view illustrating a cover of a housing according to the present invention, FIG. 4B illustrates a modification to the housing shown in FIG. 4A, FIG. 5A is a cross-sectional view illustrating a shroud of a housing according to the present invention, FIG. 5B illustrates a modification to the housing shown in FIG. 5A, and FIG. 6 is a cross-sectional view illustrating bumps mounted on a base of a housing according to the present invention.

First, the cover structures will be described with reference to FIGS. 4A and 4B.

As shown in FIG. 4A, a disk 10 is received within a housing including a cover 20 as the top of the housing, a shroud 30 as the side wall of the housing and a base 40 as the bottom of the housing. A drive unit 15 is mounted on the base 40 to turn the disk 10 around a drive axis 11.

In the cover 20, a slanted line 23 is extended from a central portion 21 of the cover 20 to the shroud 30 at an upward inclination angle with respect to the plane of the disk 10 when seen in a cross-section taken along a line perpendicular to the disk plane so that a central height h1' from the disk plane to the central portion 21 of the cover 20 on the drive axis 11 is smaller than a circumferential height h1 from the disk plane to the cover 20 at the shroud 30.

Figure 1:
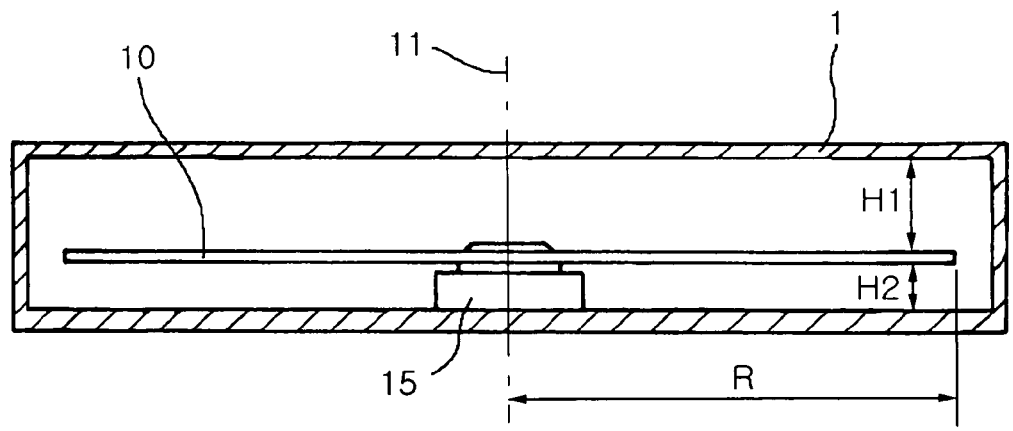
FIG. 1 is a cross-sectional view illustrating a disk and housing structure of a conventional optical storage.
Figure 3A:
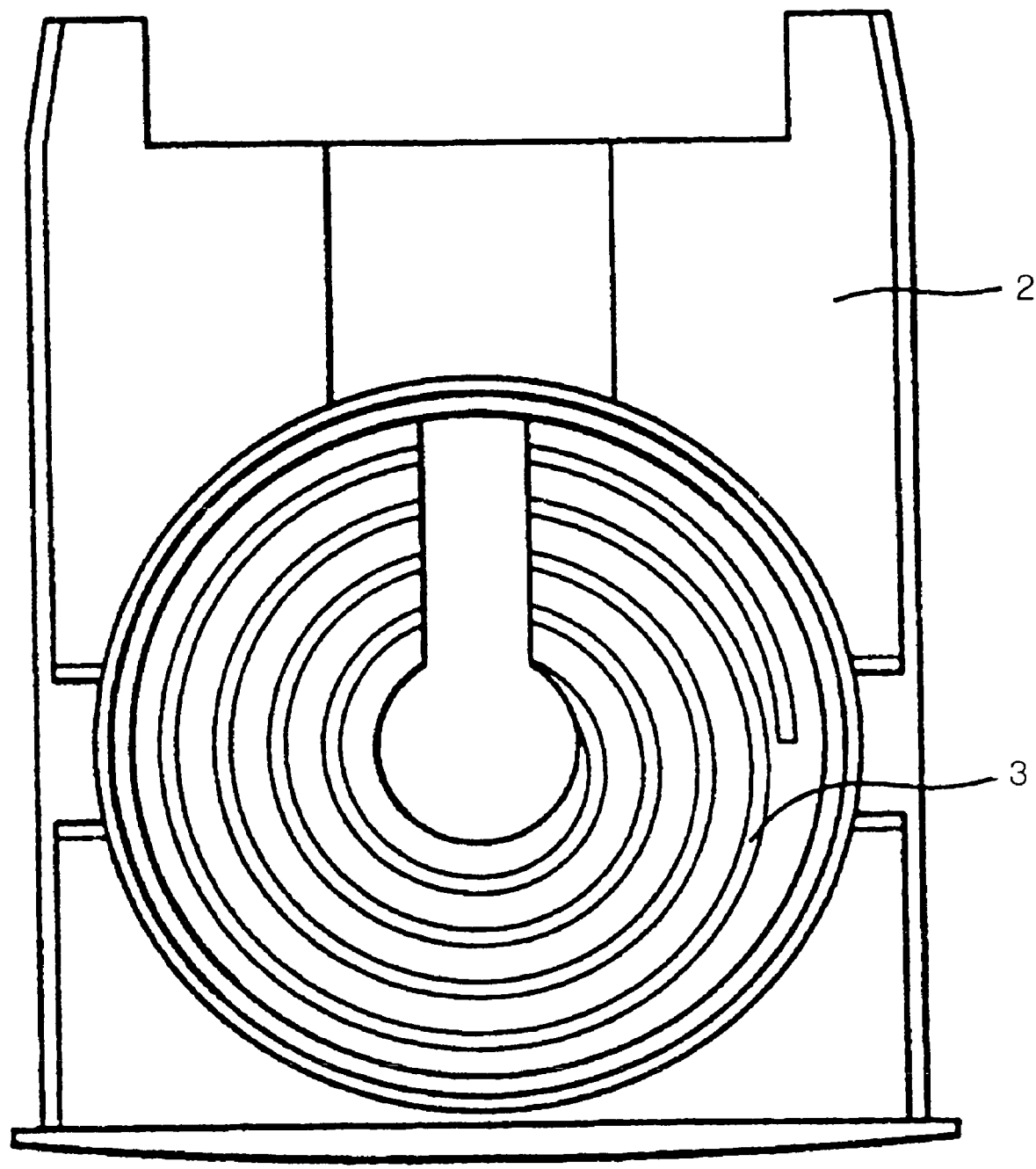
FIG. 3A is a plan view illustrating a tray of a conventional optical storage.
Figure 3B:
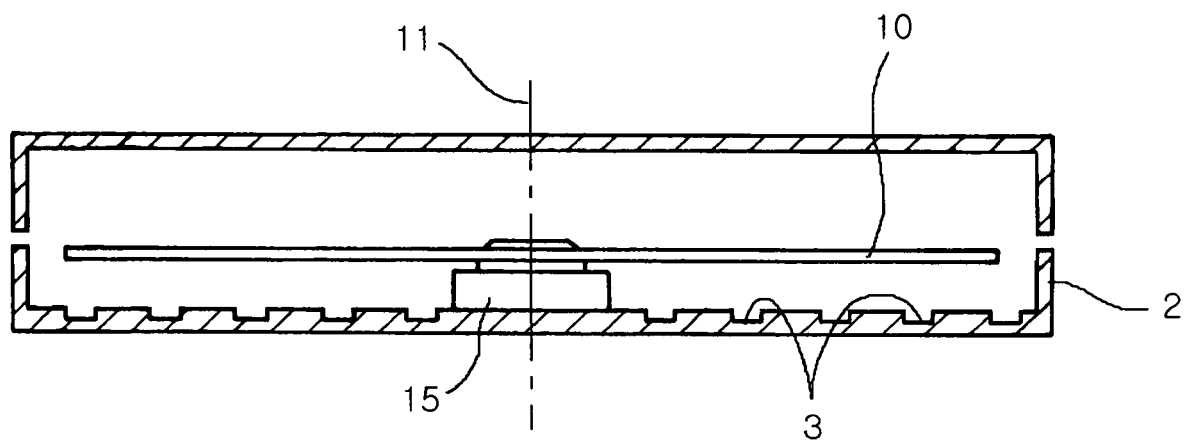
FIG. 3B is a cross sectional view of the tray shown in FIG. 3A with a disk loaded thereon.

In the cover 20 of this structure, the central height h1' from the disk plane to the central portion 21 of the cover 20 is smaller than that in FIG. 1 or 3B so that the pressure difference between above and under the disk is reduced when the disk is rotated at a high speed.

Further, in the high speed rotation of the disk as above, a high pressure occurs in the center of the disk 12 whereas a low pressure occurs in the circumference of the disk 12. The pressure difference between the disk center and the disk circumference can be reduced by reducing the central height h1' from the top of disk to the central portion 21 of the cover 20. As an advantageous effect, this structure can restrict fluttering while reducing power consumption.

The reduction of power consumption can be obtained by modifying the cover into a structure capable reducing flow resistance as above.

Preferably, as shown in FIG. 4B, a cover 20 has a central portion 21 defined by a flat surface of a predetermined height, a circumferential portion 22, which is defined by a flat surface of a predetermined height and connected to a shroud 30, and a slanted line 23, which is extended from the central portion 21 to the shroud 30 at an upward inclination angle with respect to the plane of a disk 10 when seen in a cross-section taken along a line perpendicular to the disk plane. This structure also can obtain the same effect as described above with reference to FIG. 4A. Alternatively, only one of the central portion 21 and the circumferential portion 22 may be made flat.

Further, even though the slanted line 23 is straight or curved, as the circumferential portion 22 is made higher than the central portion 21, the pressure imbalance occurring between the central and circumferential portions of the disk the cover 20 can reduced to a value smaller than that of the prior art.

In the meantime, as an angle α defined between the disk plane and a straight line connecting both ends of the slanted line increases, the pressure difference between central and circumferential portions of the disk will decrease, thereby reducing power consumption. However, because the volume of a disk-receiving space and a circumferential height h1 from the disk plane to the circumferential portion 22 of the cover 20 are limited, the angle between the disk plane and the straight line connecting the both ends of the disk plane is preferably smaller than 3 degrees.

More preferably, if the circumferential height h1 from the disk plane to the cover is about 2 mm when a disk having a diameter of 4.72 inch (12 cm) is used, the angle α between the disk plane and the straight line connecting both ends of the slanted line ranges about 0.9 to 1.5 degrees.

Figure 2:
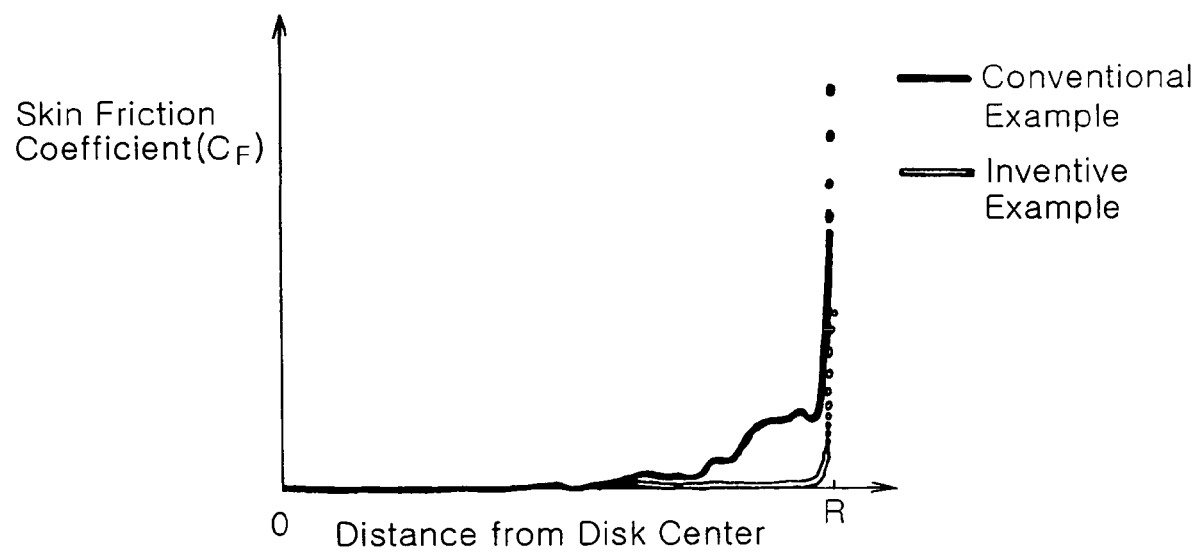
FIG. 2 is a graph comparing skin friction coefficient curves according to the distance from the disk center in optical storages of the present invention and the prior art.

In the graph illustrating skin friction coefficient curves as shown in FIG. 2, the skin friction coefficient curve of the conventional housing has an integrated value ΣCF of 22.14. When the cover structure having an inclination angle α of 1.3 according to the present invention is applied to the conventional housing as shown in FIG. 1, the integrated value of a skin friction coefficient curve sharply drops to 8.679, which is about 40% of the conventional value, thereby reducing power consumption.

Accordingly, the above-described cover structure of the present invention can reduce fluttering that is observed in the prior art. This also reduces flow resistance thereby saving power consumption.

Hereinafter the structure of a shroud 30 as the side wall of a housing will be described with reference to FIGS. 5A and 5B.

As shown in FIG. 1, the conventional shroud is simply angled into a box-like configuration. This structure causes fluid flow generated around the outer circumference of a disk 10 to collide into the shroud or angled portions thereby creating turbulence, which in turn acts as flow resistance.

According to the present invention, the shroud 30 has a curved portion 31 which is expanded outward away from the disk 10 in order to reduce the resistance of flow that is redirected between the outer circumference 12 of the disk 10 and the shroud 30.

More preferably, the curved portion 31 has lower and upper curved sections 32 and 33 on the basis of the top and underside of the disk as shown in FIG. 5B. At the outer circumference of the disk 12, the upper and lower curved sections 32 and 33 divide flow directed toward a shroud into two partial flows directed toward under and above the disk, respectively.

In the graph illustrating skin friction coefficient curves as shown in FIG. 2, the skin friction coefficient curve of the conventional housing has an integrated value ΣCF of 22.14. When the shroud structure having the two curved sections according to the present invention is applied to the conventional housing as shown in FIG. 1, the integrated value of a skin friction coefficient curve sharply drops to 11.679, which is about ½ of the conventional value, thereby reducing power consumption.

The shroud of this structure can decrease the intensity of turbulence generating around the outer circumference of the disk to reduce flow resistance thereby saving power consumption. As an additional effect, this shroud structure can also reduce noise and vibration related with the noise.

Next the structure of a base 40 as a bottom of a housing will be described with reference to FIG. 6.

When a disk 10 rotates at a high speed, radial flow rate generally increases in proportion to the rotation speed of the disk 10 but maintains a constant value after the speed exceeds a critical point. On the outer circumference of the disk 10, laminar flow is changed into turbulent motion or turbulence. Then, this turbulence creates vibration and fluttering to the disk through flow fluctuation having a high energy thereby to enhance shear stress which is applied to the outer circumference of the disk 10.

The enhancement of shear stress also raises torque thereby increasing the consumption of power, which is required for turning the disk 10.

The present invention introduces a bump 41 projected from a base 40 in order to reduce radial force which is generated in a radial direction of the disk.

That is, the bump 41 is projected from the base 40 along a concentric circle around the center of rotation of the disk 10 as shown in FIG. 6 in order to reduce shear stress which significant on the outer circumference of the disk 10 owing to the rotation of the disk 10.

It is preferable that the bump 41 projected from the base 40 along the concentric circle forms an enclosed circle. Of course, the bump 41 may be provided as arc-shaped bump sections that are formed by cutting some portions of a concentric circle in order to facilitate the operation of devices which record/play the optical storage.

While the height of the bump 41 may be determined according to the gap from the base to the underside of the disk 10, the bump 41 is preferably placed in a region of the base 40 corresponding to the outer circumference of the disk 10 in order to prevent rapid increase of shear stress on the outer circumference of the disk 10.

More specifically, as shown in FIG. 6, an inner side of the bump 41 facing the disk center meets the base 40 on a point (represented by an inner radius r) distanced from the disk center for about 0.7 to 0.9 times of the radius R of the disk 10. At this meeting point, the inner side of the bump 41 is slanted upward with respect to the base 40 toward the circumference of the disk 10 at an inclination angle β of 30 to 90 degrees.

The bump 41 of this structure serves to restrain the radial flow of fluid created under the disk in order to reduce shear stress and flow resistance on the outer circumference of the disk.

In the graph shown in FIG. 2, the integrated value ΣCF of the skin friction coefficient curve of the conventional housing structure shown in FIG. 1 is 22.14 as described above. However, when the base structure having the bump of the present invention is applied to the conventional housing structure shown in FIG. 1, the integrated value ΣCF of a skin friction coefficient curve becomes 9.662, which is about 44% of the conventional value. Power consumption can be also reduced in this way.

In this case, the integrated value ΣCF of the skin friction coefficient curve was calculated from a bump which has the inner side facing the disk center, in which the inner side meets the base 40 at a point (where r is 0.75R) distanced from the disk center for 0.75 times of the radius R of the disk 10 and has an inclination angle of 45 degrees with respect to the base 40.

In the conventional housing structure as shown in FIGS. 3A and 3B, the integrated value ΣCF of skin friction coefficient is 12.980. In this case, the integrated value ΣCF of skin friction coefficient according to the base structure of the present invention is also reduced for about 25% from that of the conventional housing structure shown in FIGS. 3A and 3B, and therefore can reduce power consumption also.

Figure 7:
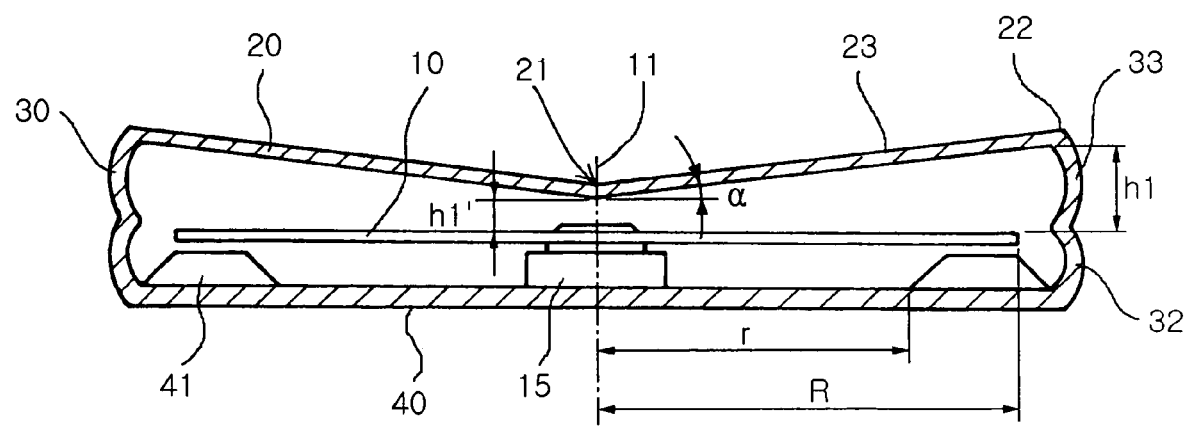
FIG. 7 is a cross-sectional view illustrating a housing which adopts a cover structure, a shroud structure and a bump structure on a base according to the present invention.

Accordingly, the application of the above-described base structure can reduce the intensity of turbulence occurring on the outer circumference of the disk to decrease flow resistance, thereby reducing power consumption FIG. 7 is a cross-sectional view illustrating a housing which adopts all of the cover structure, the shroud structure and the bump structure on the base which have been described in the foregoing embodiments of the present invention. As shown in FIG. 7, the housing of an optical storage includes a cover 20 having a central height h1' from the disk plane to a central portion 11 of the cover 20 smaller than a circumferential height h1 from the disk plane to the outer circumference 22 of the cover 20, a shroud 30 having curved sections 32 and 33 expanded outward and a bump 41 projected from a base 40. A skin friction coefficient curve obtained from the housing structure of the present invention shown in FIG. 7 is plotted in the graph shown in FIG. 2.

As described hereinbefore, the present invention imparts novel structures or configurations to the disk-receiving housing of the cover 20, the shroud 30 and the base 40 in order to decrease the resistance of flow occurring on the disk of high speed rotation thereby reducing skin friction and power consumption.

These effects can be obtained by applying each of the cover 20, the shroud 30 and the base 40 of the invention to the conventional housing as shown in FIG. 1 or FIGS. 3A and 3B. Alternatively, at least two of these structures of the invention can be combined together in order to reduce power consumption compared to the conventional structures.

In particular, where all of the cover 20, the shroud 30 and the base 40 of the present invention are combined together, the integrated value ΣCF of the skin friction coefficient curve of the present invention in FIG. 2 becomes 7.89, which is about ⅓ of the conventional value 22.14, thereby to reduce power consumption by a large quantity.

As set forth above, the present invention designs a disk-receiving space into a structure capable of reducing flow resistance, which is induced from turbulent motion in the high speed rotation of the disk, in order to reduce flow resistance so that the skin friction coefficient on the disk surface can be decreased thereby reducing power consumption.

Further, the present invention can reduce flow resistance on the disk surface and within the housing to decrease the pressure difference exiting among the top, the underside, the central portion and the circumferential portion of the disk. This can decrease noise, vibration and fluttering thereby to reduce flow resistance and power consumption related thereto.

While the present invention has been shown and described in connection with the preferred embodiments, it will be apparent to those skilled in the art that modifications and variations can be made without departing from the spirit and scope of the invention as defined by the appended claims.

Moreover, the description of the specification and the claims can be applied to any types of devices (including HDD) for reading data from a disk in high speed rotation and/or writing data into the disk in addition to the common optical storage.

What is claimed is:

1. An optical storage, comprising;
a housing defining therein a space;
a disk received in the space;
a base defining a bottom of the housing;
a drive unit mounted on the base for turning the disk around a drive axis;
a shroud defining a side wall of the housing and having a curved portion, the curved portion being expanded outwardly away from the disk;
a bump projecting from the base toward the disk along a circle concentric with the drive axis for reducing shear stress generated at a circumference of the disk due to the rotation of the disk; and
a cover defining a top of the housing;
wherein the cover has a slanted, circumferential portion extending from a central portion of the cover toward the shroud at an upward inclination with respect to a disk plane of the disk when seen in a cross-section taken along a line perpendicular to the disk plane, so that a central height from the disk plane to the central portion of the cover on the drive axis is smaller than a circumferential height from the disk plane to the cover at the shroud, whereby flow resistance to the rotation of the disk is reduced to reduce power consumption.

2. The optical storage according to claim 1, wherein at least one of the central portion and the circumferential portion of the cover has a flat section parallel with and at a predetermined height above the disk.

3. The optical storage according to claim 2, wherein the slanted circumferential portion is straight or curved, and wherein an angle defined between the disk plane and a straight line connecting opposite ends of the slanted circumferential portion is smaller than 3 degrees.

4. The optical storage according to claim 3, wherein the angle defined between the disk plane and the straight line is in the range from about 0.9 to 1.5 degrees.

5. The optical storage according to claim 1, wherein the slanted circumferential portion is straight or curved, and wherein an angle defined between the disk plane and a straight line connecting opposite ends of the slanted circumferential portion is smaller than 3 degrees.

6. The optical storage according to claim 5, wherein the angle defined between the disk plane and the straight line is in the range from about 0.9 to 1.5 degrees.

7. The optical storage according to claim 1, wherein the curved portion has lower and upper curved sections below and above the disk plane, respectively, for dividing a flow directed toward the shroud into two partial flows directed below and above the disk, respectively, at the circumference of the disk.

8. The optical storage according to claim 1, wherein
the bump has an inner side facing the drive axis,
the inner side meets the base at a point distanced from the drive axis for about 0.7 to 0.9 times of a radius of the disk and is slanted upward with respect to the base toward the circumference of the disk at an angle of about 30 to 90 degree.

* * * * *